(12) United States Patent
Kim et al.

(10) Patent No.: US 8,189,675 B2
(45) Date of Patent: May 29, 2012

(54) METHOD, MEDIUM AND SYSTEM STORING IMAGE DATA FOR FAST MEMORY ACCESS

(75) Inventors: Doo-hyun Kim, Yongin-si (KR); Jae-sung Park, Yongin-si (KR); Si-hwa Lee, Yongin-si (KR); Do-hyung Kim, Yongin-si (KR)

(73) Assignee: Samsung Electonics Co., Ltd., Suwon-Si (KR)

( * ) Notice: Subject to any disclaimer, the term of this patent is extended or adjusted under 35 U.S.C. 154(b) by 1316 days.

(21) Appl. No.: 11/730,130

(22) Filed: Mar. 29, 2007

(65) Prior Publication Data

US 2007/0263726 A1    Nov. 15, 2007

(30) Foreign Application Priority Data

May 10, 2006    (KR) .................. 10-2006-0041963

(51) Int. Cl.
*H04N 7/50* (2006.01)
(52) U.S. Cl. .................................. 375/240.24
(58) Field of Classification Search ............. 375/E7.148, 375/E7.17, E7.176, E7.224, E7.1, E7.256, 375/240.24
See application file for complete search history.

(56) References Cited

U.S. PATENT DOCUMENTS 5,978,509 A * 11/1999 Nachtergaele et al. ....... 382/236
6,215,822 B1 * 4/2001 Bose et al. ............... 375/240.16

FOREIGN PATENT DOCUMENTS

| JP | 2001-346203 | 12/2001 |
| JP | 2004-040575 | 2/2004 |
| JP | 2005-065239 | 3/2005 |

OTHER PUBLICATIONS

Machine translation for "Decoding Device of Anmation" Japanese Publication No: 2005-065239 (Mar. 10, 2005) obtained from "http://www19.ipdl.inpit.go.jp/PA1/cgi-bin/PA1INDEX" on Feb. 1, 2012.*
Machine translation for "Motion-Compensation Unit" Japanese Publication No: 2004-040575 (Feb. 5, 2004) obtained from "http://www19.ipdl.inpit.go.jp/PA1/cgi-bin/PA1INDEX" on Feb. 1, 2012.*
Machine translation for "Image Processing Unit, Image Processing Method, and Storage Medium, " Japanese Publication No: 2001-346203 (Dec. 14, 2001) obtained from "http://www19.ipdl.inpit.go.jp/PA1/cgi-bin/PA1INDEX" on Feb. 1, 2012.*

* cited by examiner

*Primary Examiner* — Gilberto Barron, Jr.
*Assistant Examiner* — Simon Kanaan
(74) *Attorney, Agent, or Firm* — Staas & Halsey LLP

(57) ABSTRACT

Provided is a method, medium and system for storing image data for fast memory access. The method includes setting a storage range over neighboring macroblocks of a macroblock to allow for storage with the macroblock in a storage region of a memory, and storing first image data of the macroblock and second image data corresponding to the storage range over the neighboring macroblocks in the storage region of the memory, wherein the second image data includes data of portions of the neighboring blocks that fall within the storage range.

18 Claims, 12 Drawing Sheets

METHOD, MEDIUM AND SYSTEM STORING IMAGE DATA FOR FAST MEMORY ACCESS

CROSS-REFERENCE TO RELATED APPLICATIONS

This application claims the benefit of Korean Patent Application No. 10-2006-0041963, filed on May 10, 2006, in the Korean Intellectual Property Office, the disclosure of which is incorporated herein in its entirety by reference.

1. Field

One or more embodiments of the present invention relates to real-time processing of images, and more particularly, to a method, medium and system for storing image data to minimize the time delay required for accessing the image data.

2. Description of the Related Art

FIGS. 1A and 1B explain conventional techniques for storing image data in a memory.

A frame of image data is stored in units of a line in each row of a memory as shown in FIG. 1A, and the frame is stored in units of a macroblock in each row of a memory in FIG. 1B.

In FIG. 1A, respective access requests typically need to be made to each row of the memory in order to access the stored image data. However, for dynamic random access memory (DRAM), most of the time required for accessing the DRAM is consumed in accessing each additional row of the DRAM. Since such an access usually should be made to each row of a memory in order to access the stored image data, this results in extensive time being required for accessing the image data. In general, when the time required for reading data from a memory is, for example, "1" time unit, the delay required for accessing another row of the memory is "12" time units. As a result, substantial time delay occurs when an access is made from one row to another.

Thus, image data has been stored in units of a macroblock, as shown in FIG. 1B in each row of a memory. As illustrated in FIG. 1B, when image data is stored in units of a macroblock in each row of a memory, 9×9 image data required for motion compensation may range over four macroblocks of a previous frame. Here, access requests may need to be made to four different rows of the memory to access image data of the four macroblocks. Thus, even when the previous frame is stored in units of a macroblock, if image data required for motion compensation ranges over a plurality of macroblocks, additional rows also need to be accessed, resulting in substantial time being required for accessing the memory.

SUMMARY

One or more embodiments of the present invention provide a method, medium and system for storing image data for fast memory access, in which the number of accesses to a memory is reduced when the image data is stored in the memory, thereby minimizing time delays in accessing the image data.

Additional aspects and/or advantages of the invention will be set forth in part in the description which follows and, in part, will be apparent from the description, or may be learned by practice of the invention.

To achieve at least the above and/or other aspects and advantages, embodiments of the present invention include a method of storing image data for fast memory access. The method includes setting a storage range over neighboring macroblocks of a macroblock to allow for storage with the macroblock in a storage region of a memory, and storing first image data of the macroblock and second image data corresponding to the storage range over the neighboring macroblocks in the storage region of the memory, wherein the second image data includes data of portions of the neighboring blocks that fall within the storage range.

To achieve at least the above and/or other aspects and advantages, embodiments of the present invention include a system storing image data for fast memory access. The system includes a storage range setting unit to set a storage range over neighboring macroblocks of a macroblock to allow for storage with the macroblock in a storage region of a memory, and a memory control unit to store first image data of the macroblock and second image data corresponding to the storage range over the neighboring macroblocks in the storage region of the memory, wherein the second image data includes data of portions of the neighboring blocks that fall within the storage range.

To achieve at least the above and/or other aspects and advantages, embodiments of the present invention include a system for storing image data for fast memory access. The system includes means for setting a storage range over neighboring macroblocks of a first macroblock to allow for storage with the first macroblock in a first storage region of a memory, and means for storing first image data of the first macroblock and second image data corresponding to the storage range over the neighboring macroblocks in the first storage region of the memory, so that a number of required accesses to the memory is reduced.

To achieve at least the above and/or other aspects and advantages, embodiments of the present invention include a method of storing image data for fast memory access. The method includes setting a storage range over neighboring macroblocks of a first macroblock to allow for storage with the macroblock in a first storage region of a memory, storing first image data of the first macroblock and second image data corresponding to the storage range over the neighboring macroblocks in the first storage region of the memory, and storing first image data of a second macroblock in a second storage region of the memory, wherein the second macroblock is one of the neighboring macroblocks and the second image data of the first macroblock corresponds to a portion of the second macroblock represented by the first image data of the second macroblock.

To achieve at least the above and/or other aspects and advantages, embodiments of the present invention include a system storing image data for fast memory access. The system includes a storage range setting unit to set a storage range over neighboring macroblocks of a first macroblock to allow for storage with the macroblock in a first storage region of a memory, a first memory control unit to store first image data of the first macroblock and second image data corresponding to the storage range over the neighboring macroblocks in the first storage region of the memory, and a second memory control unit to store first image data of a second macroblock in a second storage region of the memory, wherein the second macroblock is one of the neighboring macroblocks and the second image data of the first macroblock corresponds to a portion of the second macroblock represented by the first image data of the second macroblock.

To achieve at least the above and/or other aspects and advantages, embodiments of the present invention include a computer readable medium to record image data including a plurality of macroblocks. The computer readable medium includes a first memory region including first image data of a first macroblock and second image data corresponding to a storage range over neighboring macroblocks of the first macroblock in the image, and a second memory region including first image data of a second macroblock, the second macroblock being one of the neighboring macroblocks, and wherein the second image data of the first macroblock corresponds to a portion of the second macroblock represented by the first image data of the second macroblock.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF EMBODIMENTS

Figure 1A:
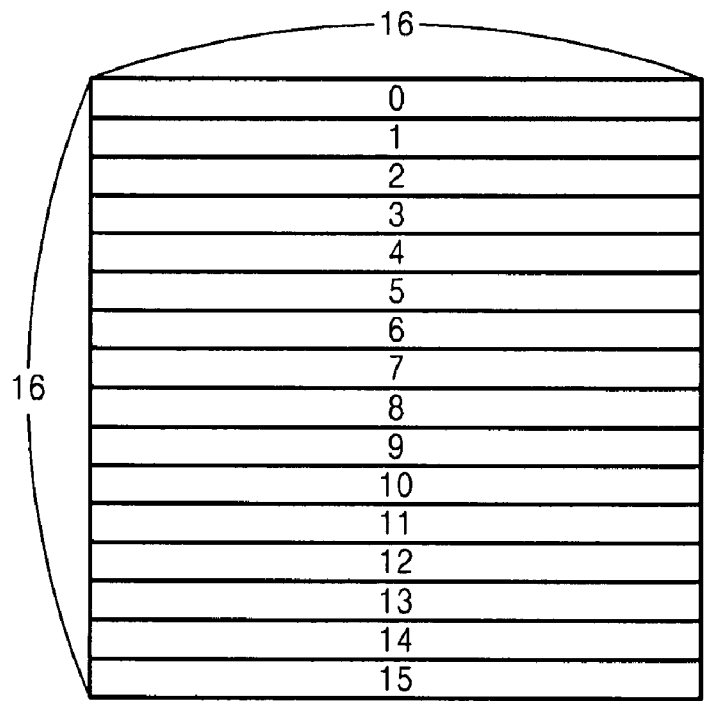
FIGS. 1A and 1B explain conventional techniques for storing image data in a memory.

Reference will now be made in detail to embodiments of the present invention, examples of which are illustrated in the accompanying drawings, wherein like reference numerals refer to the like elements throughout. Embodiments are described below to explain the present invention by referring to the figures.

Figure 2:
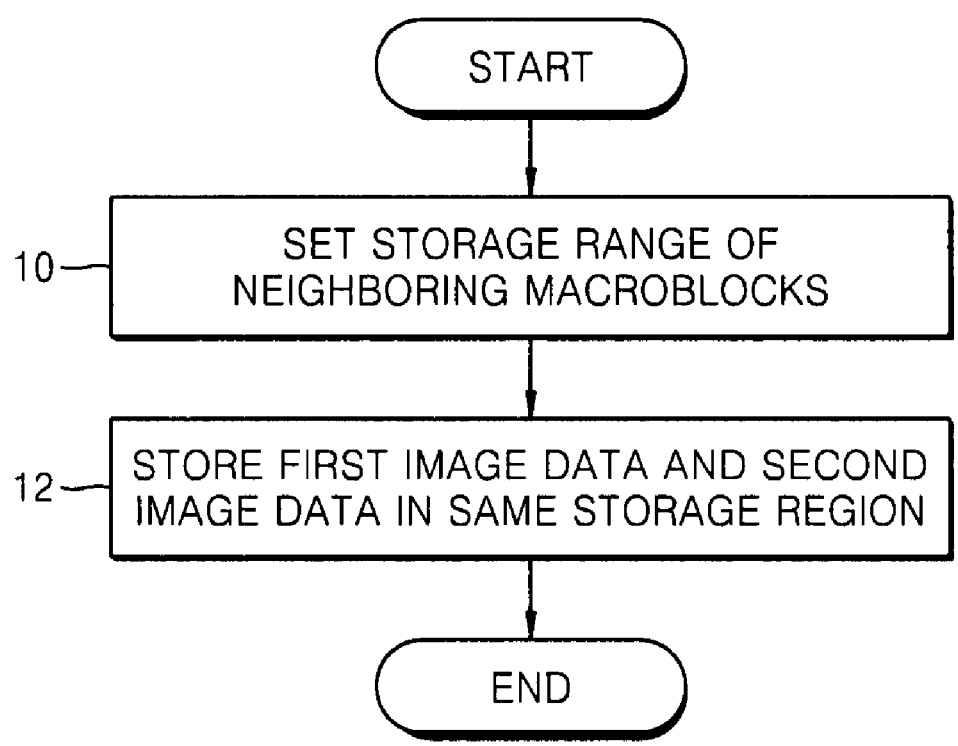
FIG. 2 illustrates a method of storing image data for fast memory access, according to an embodiment of the present invention.

FIG. 2 illustrates a method of storing image data for fast memory access, according to an embodiment of the present invention. In one or more embodiments of the present invention, each macroblock of image data may be stored in each row of memory, and select regions of neighboring macroblocks of a corresponding macroblock, which are adjacent to the corresponding macroblock, may be included with each corresponding macroblock for storage in a row of the memory. In other words, by storing the adjacent select regions of the neighboring macroblocks together with the corresponding macroblock, information may be obtained from a single row of memory without the need to access another row even when accesses across a plurality of macroblocks may be required.

To this end, as shown in FIG. 2, the storage range of neighboring macroblocks of a predetermined macroblock may be set in operation 10. If the predetermined macroblock has a size of M×N and a reference block has a size of a×b, the storage range of neighboring macroblocks may be set to the range of neighboring macroblocks that overlap with an expanded block having a size of (M+a−1)×(N+b−1). Here, the reference block may indicate, for example, a block for motion compensation if motion compensation is performed. Image data of the predetermined macroblock of M×N will be referred to as first image data and image data of the neighboring macroblocks that overlap with the block having a size of (M+a−1)×(N+b−1) and including the predetermined macroblock will be referred to as second image data.

For example, in an embodiment, if the predetermined macroblock to be stored has a size of 16×16 and the reference block has a size of 9×9, the expanded block may have a size of 24×24. In this case, the range of the neighboring macroblocks that overlap with the 24×24 block may be set as the storage range of the neighboring macroblocks.

The storage range is expanded according to the size of the reference block, but if the storage range with respect to a single row is limited by the structure of a memory, image data may be stored to the extent possible within the limited storage range, thereby minimizing rows of the memory. In other words, the storage range need not be fixed according to the size of the reference block, and even when the storage range is limited by a constraint such as a hardware limitation, image data may be stored to the extent possible within the limited storage range, thereby minimizing the number of memory rows that need to be accessed and increasing the speed of such accessing of the memory.

Figure 3:
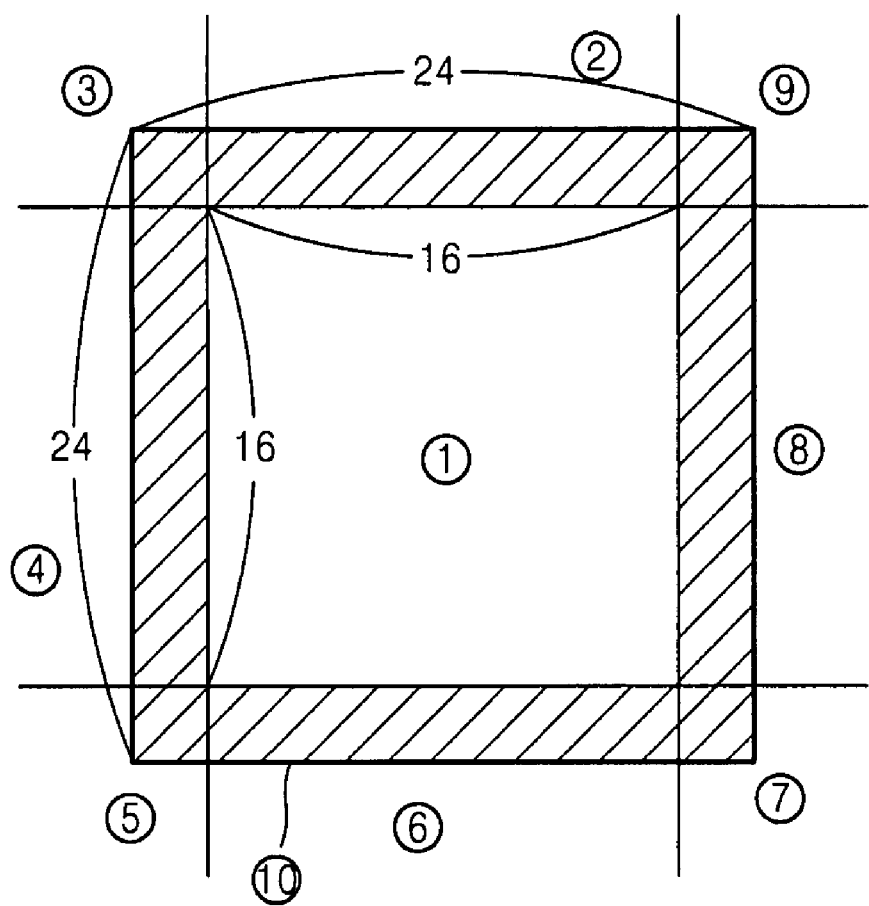
FIG. 3 illustrates an example of the storage range of neighboring blocks of a 16×16 macroblock, according to an embodiment of the present invention.

FIG. 3 illustrates an example of the storage range of neighboring blocks of a 16×16 macroblock. As illustrated in FIG. 3, the hashed portion in which neighboring blocks ② through ⑨ of a 16×16 macroblock ① overlap with a 24×24 block ⑩ may be defined as the storage range of the neighboring blocks ② through ⑨.

In an embodiment of the present invention, as illustrated in FIG. 3, the storage range may be set to include a portion in which at least one of neighboring macroblocks ②, ③, and ⑨ located above the macroblock ①, neighboring macroblocks ⑤, ⑥, and ⑦ located below the macroblock ①, neighboring macroblocks ③, ④, and ⑤ on the left side of the macroblock ①, and neighboring macroblocks ⑦, ⑧, and ⑨ on the right side of the macroblock ① overlap with the 24×24 block ⑩.

Figure 4:
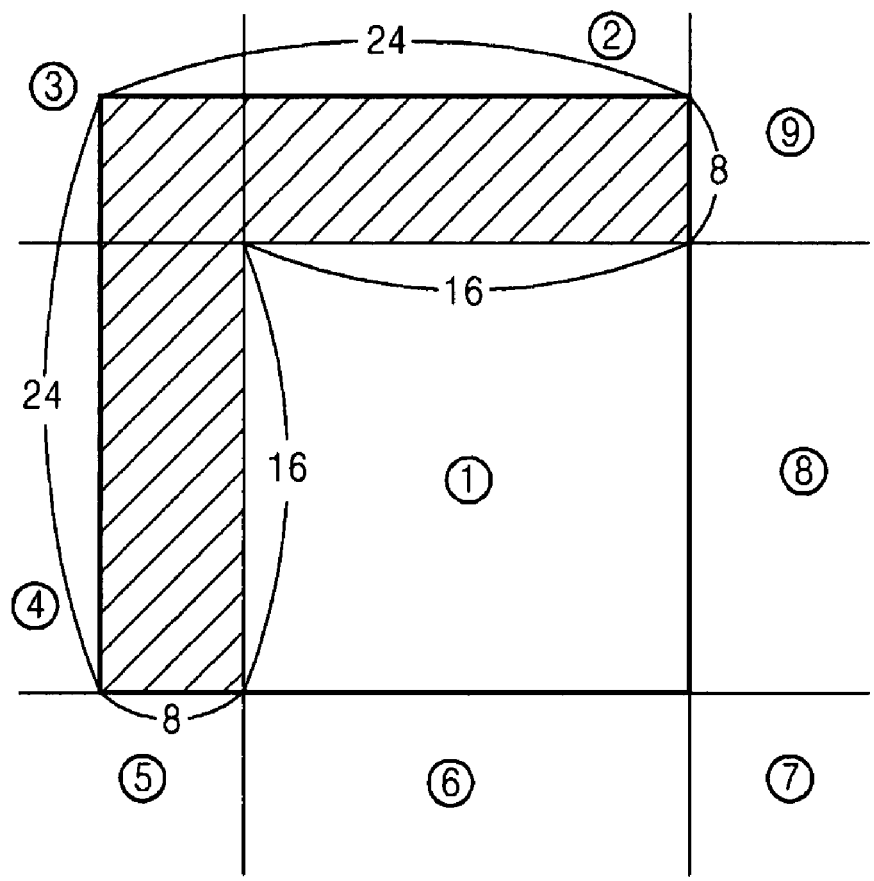
FIG. 4 illustrates another example of the storage range of neighboring blocks of a 16×16 macroblock, according to an embodiment of the present invention.

FIG. 4 illustrates another example of the storage range of neighboring blocks of a 16×16 macroblock. In FIG. 4, the storage range may be set to a region expanded to include any two adjacent sides of a 16×16 macroblock ① to be stored, the region including portions of three neighboring macroblocks ②, ③, and ⑨ located above the macroblock ①, neighboring macroblocks ⑤, ⑥, and ⑦ located below the macroblock ①, neighboring macroblocks ③, ④, and ⑤ on the left side of the macroblock ①, and neighboring macroblocks ⑦, ⑧, and ⑨ on the right side of the macroblock ①. In other words, the storage range may be set to the region included in a combination of ②, ③, and ④, a combination of ④, ⑤, and ⑥, a combination of ⑥, ⑦, and ⑧, or a combination of ⑧, ⑨, and ②. In the following description, the storage range is assumed to be set to the region included in the combination of ②, ③, and ④, but the scope of the present invention is not limited thereto.

In operation 12, the first image data of the macroblock and the second image data corresponding to the storage range of the neighboring macroblocks may be stored in the same storage region of the memory, e.g., the same row of memory. For example, as illustrated in FIG. 4, the first image data of the macroblock ①and the second image data of the neighboring macroblocks ②, ③, and ④ may be stored in the same storage region.

In particular, the same storage region may mean the same row in memory. In other words, the full range required for access of a predetermined macroblock may be stored in the same row of memory, thereby minimizing the time delay caused by having to access multiple rows of memory to obtain the predetermined macroblock. In order to store the first image data and the second image data in the same row of memory, when the storage range of the neighboring macroblocks is set, the size of the storage range of the neighboring macroblocks may be limited to a predetermined range. Here, the predetermined range may be determined in consideration of the maximum amount of data that can be stored in a row of the memory.

Below, a method of motion-compensating image data will be described with reference to FIG. 5.

Figure 5:
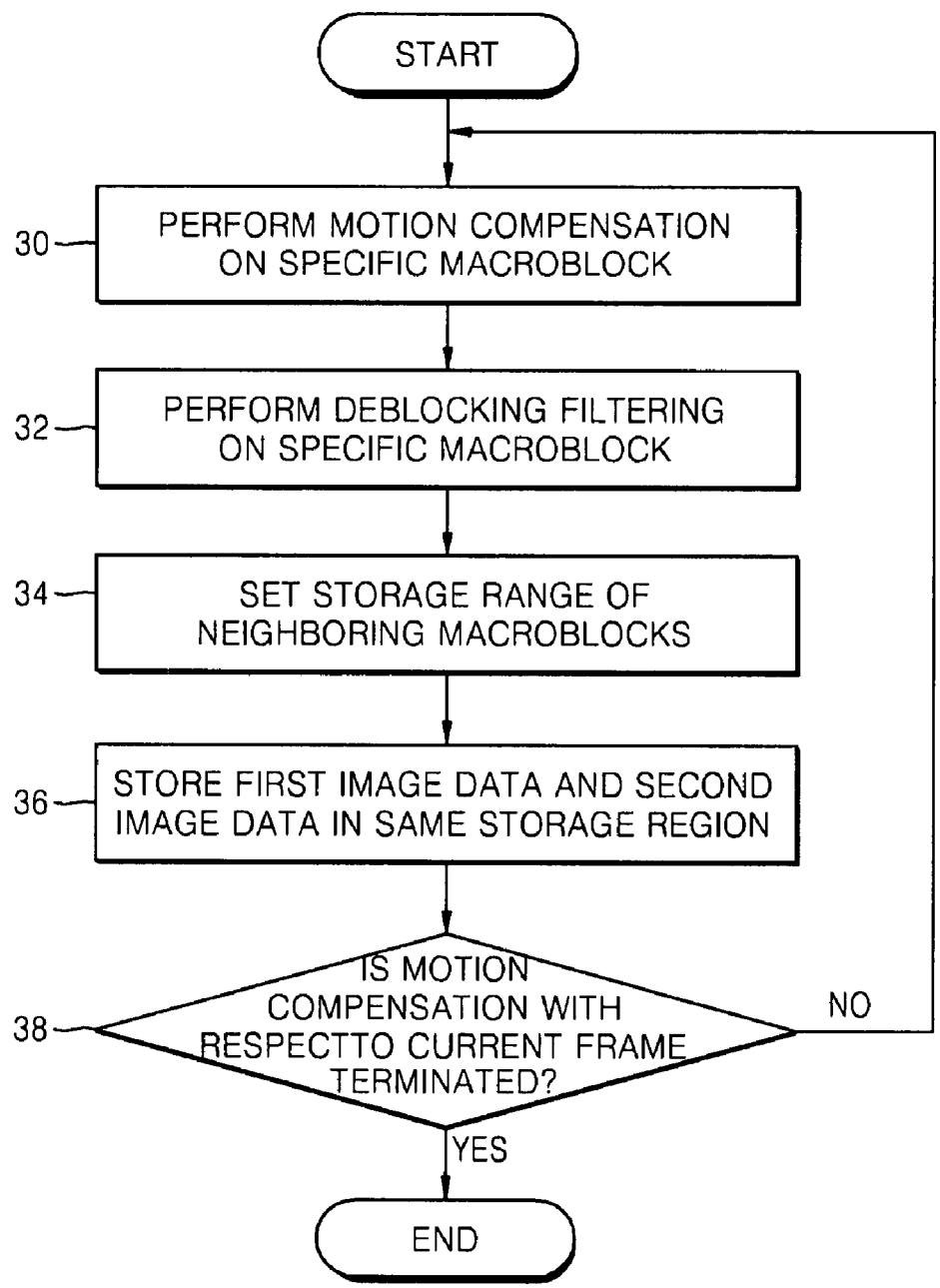
FIG. 5 illustrates a method of motion-compensating image data, according to an embodiment of the present invention.

FIG. 5 illustrates a method of motion-compensating image data for fast memory access, according to an embodiment of the present invention.

In operation 30, motion compensation may be performed on a current macroblock of a current frame using a motion-compensated previous frame. The motion compensation may be performed using information from a macroblock of the previous frame corresponding to the current macroblock. Techniques for motion compensation are known and thus will not be described in greater detail here. Image data of the previous frame used for the motion compensation may be stored by the method of storing image data for fast memory access, according to the present invention, as in operation 34 to be described in greater detail later. In an embodiment, in operation 30, the motion compensation may be performed using the image data of the previous frame that is stored.

In operation 32, deblocking filtering may be performed on the motion-compensated macroblock. Deblocking filtering refers to a process for removing distortion between macroblocks. The distortion may be generated during image decoding. Accordingly, the deblocking filtering may prevent display quality degradation on boundaries between blocks.

In operation 34, the storage range of neighboring macroblocks of the motion-compensated macroblock may be set for storage with the motion-compensated macroblock. As only an example, if the current macroblock has a size of M×N and a reference block has a size of a×b, the storage range of neighboring macroblocks may be set to the range of neighboring macroblocks that overlap with an expanded block having a size of (M+a−1)×(N+b−1). In this example, if the motion-compensated macroblock to be stored has a size of 16×16, the range of neighboring macroblocks that overlap with a 24×24 block including the motion-compensated macroblock may be set as the storage range.

In operation 36, first image data of the motion-compensated macroblock and second image data corresponding to the storage range of the neighboring macroblocks may be stored in the same storage region of the memory, e.g., within the same row of memory. Thus, in an embodiment, when first image data of the deblocking-filtered macroblock is stored in the memory, the first image data and the second image data of the neighboring macroblocks of the deblocking-filtered macroblock may be stored in the same storage region of the memory. The memory is a space in which image data of the previous frame required for motion compensation may be stored.

The second image data and the first image data may thus be stored in the same storage region. In particular, the same storage region may generally mean the same row of memory.

By storing the first image data and the second image data in the same row, the time required for accessing image data of neighboring macroblocks for motion compensation of a next frame may be reduced. At this time, to store the first image data and the second image data in the same row of memory, the size of the second image data may be limited to a predetermined size. The predetermined size may be determined in consideration of the maximum amount of data that can be stored in a row of the memory.

Figure 6:
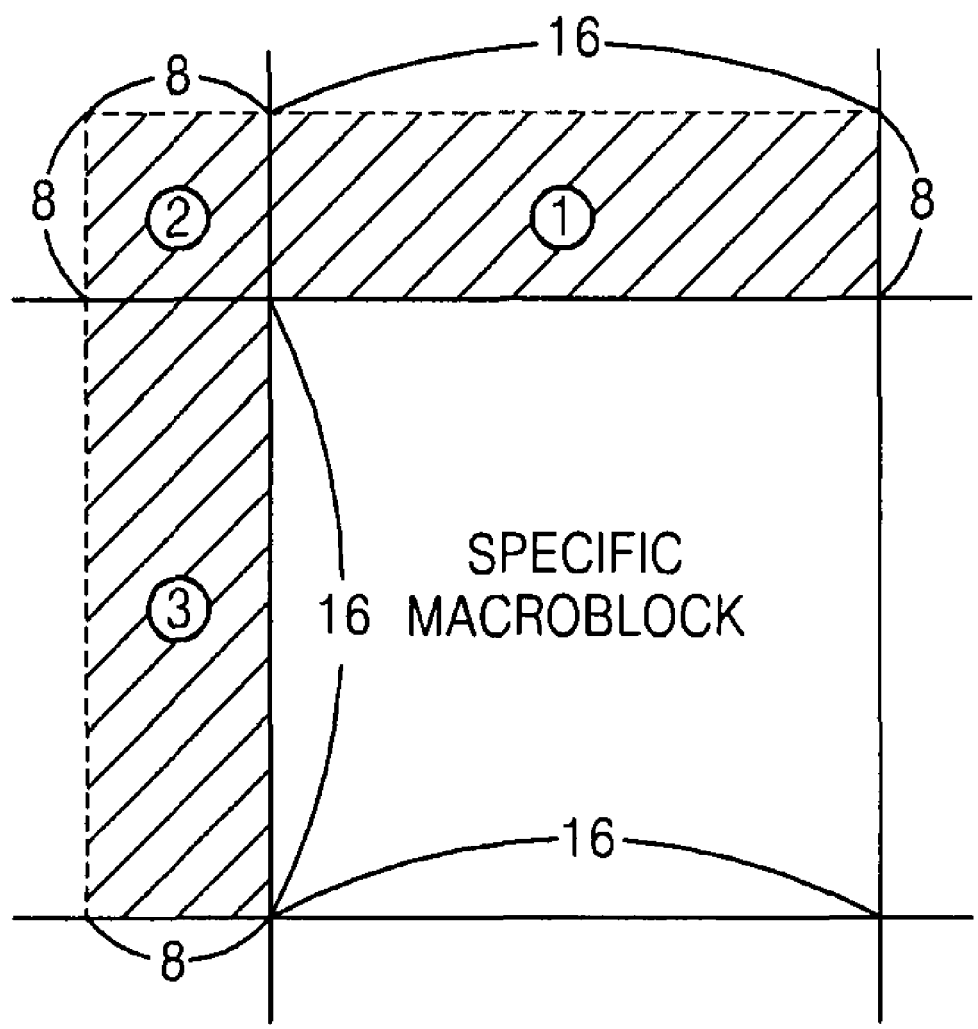
FIG. 6 illustrates an example for explaining the storage of first image data and second image data in the same storage region, according to an embodiment of the present invention.

As illustrated in FIG. 4, the storage range, in this example, is assumed to be set to a region included in the combination of ②, ③, and ④. FIG. 6 illustrates an example for explaining operation 36 of FIG. 5. It can be seen in FIG. 6 that a first partial block of a first neighboring macroblock ① is a 16×8 block, a second partial block of a second neighboring macroblock ② is an 8×8 block, and a third partial block of a third neighboring macroblock ③ is an 8×16 block. As illustrated in FIG. 6, when a motion-compensated macroblock is stored in memory, image data of the partial blocks of the first neighboring macroblock ①, the second neighboring macroblock ②, and the third neighboring macroblock ③ may be stored as second image data, together with first image data of the motion-compensated macroblock, in the same row of memory. By storing image data of first through third neighboring macroblocks of a specific macroblock of a current frame in the same row of the memory, the image data of the first through third neighboring macroblocks required for motion compensation of a next frame may be accessed in the same row of the memory. Therefore, since it is not necessary to access image data for motion compensation by accessing another row of memory, time delays caused by accessing multiple rows are minimized and a smaller amount of bandwidth is needed to perform the motion compensation.

Figure 7A:
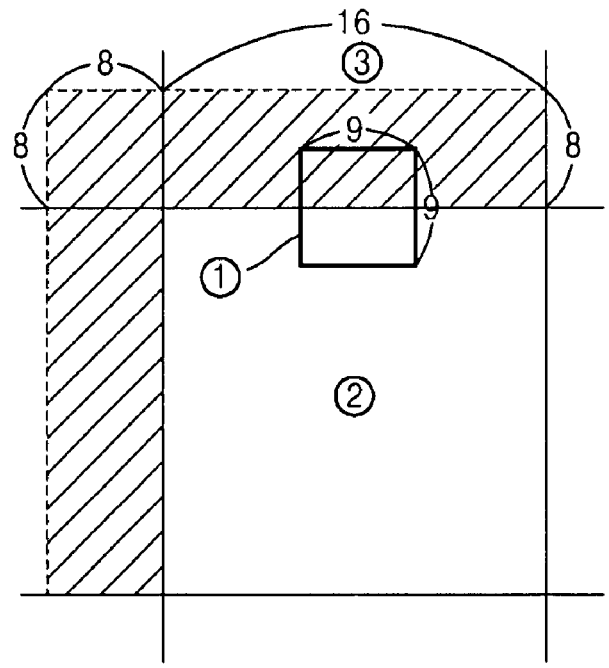
FIGS. 7A and 7B illustrate examples explaining 4×4 block-based motion compensation, according to an embodiment of the present invention.
Figure 7B:
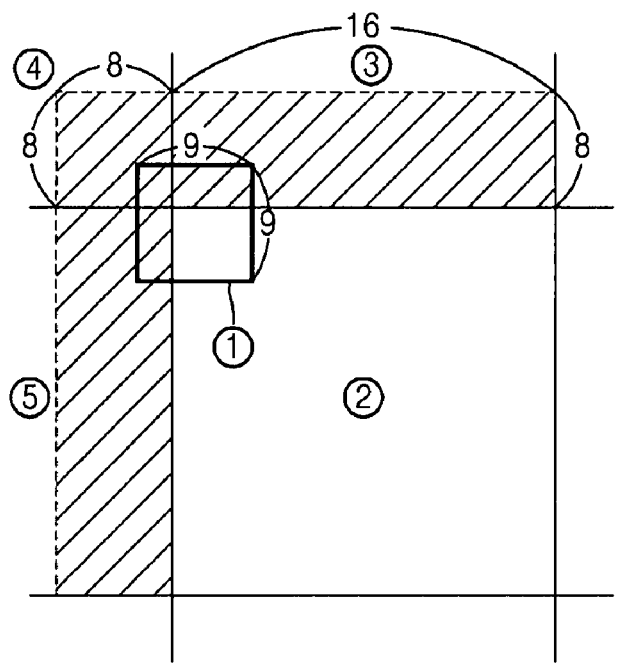

FIGS. 7A and 7B explain an example of 4×4 block-based motion compensation. In FIG. 7A, a 9×9 block ① of a previous frame corresponding to a 4×4 block of a current frame for motion compensation is illustrated. Here, the 9×9 block ① may be desirable because image data adjacent to the 4×4 block is helpful for image interpolation. In H.264/AVC, two pixels located on the left side of a block of a previous frame, three pixels located on the right side of the block, two pixels located above the block, and three pixels located below the block may be used as information for image interpolation. Thus, for 4×4 block-based motion compensation, the 9×9 block ① of the previous frame may be used. It can be seen in FIG. 7A that the 9×9 block ① of the previous frame corresponding to the 4×4 block of the current frame ranges over macroblocks ② and ③ of the previous frame. Even if the 9×9 block ① of the previous frame ranges over macroblocks ② and ③ of the previous frame, image data of the macroblock ② and image data of a portion of macroblock ③ may be simultaneously stored in the same row of a memory at the time of storage of the image data of the macroblock ②. Thus, information for motion compensation may be read with a single access to the memory without the need to access another row when the image data of the 9×9 block ① is accessed. In FIG. 7B, a 9×9 block ① of a previous frame corresponding to a 4×4 block of the current frame ranges over macroblocks ②, ③, ④, and ⑤ of the previous frame. As mentioned above, even if the 9×9 block ① of the previous frame ranges over the macroblocks ②, ③, ④, and ⑤ of the previous frame, image data of the macroblock ② and image data of portions of the macroblocks ③, ④, and ⑤ may be simultaneously stored in the same row of a memory at the time of storage of the image data of the macroblock ②. Thus, information for motion compensation may be read with a single access without requiring access to another row when the image data of the 9×9 block ① is accessed.

Figure 8:
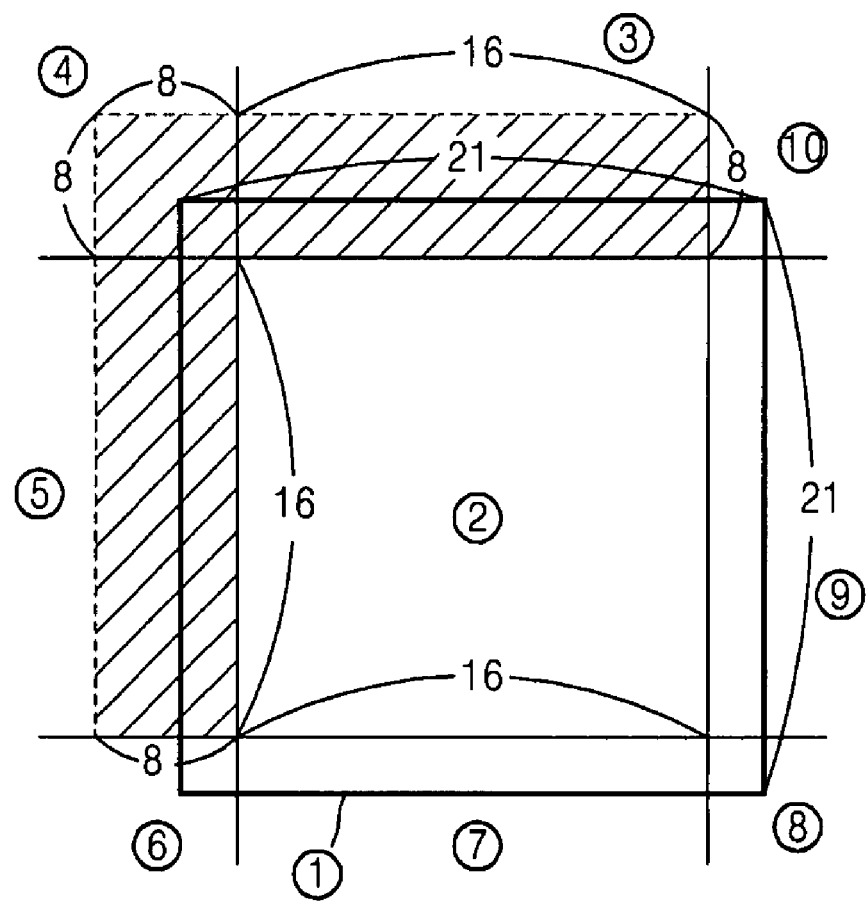
FIG. 8 illustrates an example explaining 16×16 block-based motion compensation, according to an embodiment of the present invention.

FIG. 8 illustrates an example explaining 16×16 block-based motion compensation. In FIG. 8, a 21×21 block ① of a previous frame corresponding to a 16×16 block of a current frame for motion compensation is illustrated. The 21×21 block ① of the previous frame may be desired because image data adjacent to the 16×16 block is helpful for image interpolation. As mentioned above, in H.264/AVC, two pixels located on the left side of a block of a previous frame, three pixels located on the right side of the block, two pixels located above the block, and three pixels located below the block may be used as information for image interpolation. Thus, for 16×16 block-based motion compensation, the 21×21 block ① of the previous frame may be used. It can be seen in FIG. 8 that the 21×21 block ① of the previous frame corresponding to the 16×16 block of the current frame ranges over macroblocks ② through ⑩ of the previous frame. Even if the 21×21 block ① of the previous frame ranges over macroblocks ② through ⑩ of the previous frame, image data of the macroblock ② and image data of portions of the macroblocks ③, ④, and ⑤ may be simultaneously stored in the same row of a memory at the time of storage of the image data of the macroblock ②. Thus, image data of the macroblocks ③, ④, and ⑤ may be accessed with a one-time access without requiring an access to another row when the image data of the 21×21 block ① is accessed.

In operation 38, motion compensation with respect to the current frame may be terminated. If the motion compensation is not terminated, operations 30 through 36 may be repeated.

If the motion compensation is terminated, the process may be terminated. Once motion compensation with respect to the current frame and storage of the motion-compensated current frame in the memory are completed, motion compensation with respect to a next frame may be performed. The motion compensation with respect to the next frame may be performed using the first image data and the second image data stored in the same storage region of the memory.

The times required for memory access according to one or more embodiments of the present invention has been compared with the conventional memory access times in Table 1.

TABLE 1

|  | Read | Write | Total cycle |
|---|---|---|---|
| Conventional Technique 1 (Frame mapping) | (L * 9 + 27) * 16 | L * 16 + 4 * 16 | L * 160 + 496 |
| Conventional Technique 2 (Macroblock mapping) | (L * 4 + 27) * 16 | L + 4 * 16 | L * 65 + 496 |
| Example embodiment of the present invention | (L + 27) * 16 + (6 * 8 + 2 * 16) | L + 4 * 16 + (6 * 8 + 2 * 16) + (2 * 16 + 4 * 8) | L * 17 + 720 |

Figure 1B:
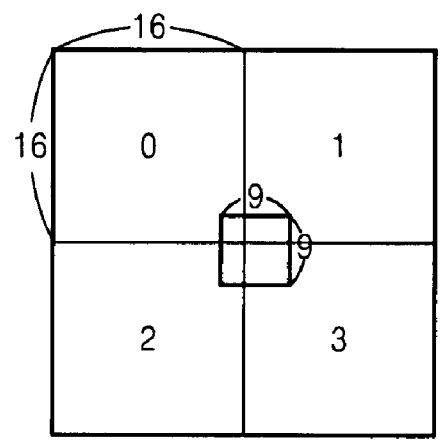

Here, L indicates a unit time required to make an access from a row to another in a memory and may denote a long period of time above 12 cycles. The time in Table 1 is the time required for read and write operations with respect to image data of a macroblock, e.g., a 16×16 block. In Conventional Technique 1, as illustrated in FIG. 1A, image data for motion compensation may be stored in units of a frame in a predetermined memory and the stored image data may be read in units of a frame. According to Conventional Technique 1, the time required for storing and reading image data is L*160+ 496, as set forth in Table 1. In Conventional Technique 2, as illustrated in FIG. 1B, image data for motion compensation is stored in units of a macroblock in the memory and the stored image data may be read in units of a macroblock. According to Conventional Technique 2, the time required for storing and reading image data is L*65+496 as set forth in Table 1. In one or more embodiments of the present invention, image data may be stored in units of a macroblock in a predetermined memory and not only image data of a macroblock but also image data of macro blocks neighboring the macroblock may be stored in the same row of memory. The time required to store image data of a motion-compensated macroblock and image data of neighboring macroblocks of the motion-compensated macroblock in the same row may be (L+4*16)+ (6*8+2*16)+(2*16+4*8), in which the time associated with L is reduced, a storage range in the memory increases when compared to Conventional Technique 2, and thus an additional time of (6*8+2*16)+(2*16+4*8) may be required. The additional time is the time required for storing image data of neighboring blocks. In other words, in (6*8+2*16), 6*8 may be the time required for a read operation with respect to a 24×8 block that is a partial block of neighboring macroblocks located above the macroblock, and 2*16 may be the time required for a read operation with respect to an 8×16 block that is a partial block of neighboring macroblocks located on the left side of the macroblock. In (2*16+4*8), 2*16 is the time required for a write operation with respect to an 8×16 block that is a partial block of neighboring macroblocks located on the left side of the macroblock and 4*8 is the time required for a write operation with respect to a 24*8 block that is a partial block of neighboring macroblocks located above the macroblock. In one or more embodiments of the present invention, the stored image data may be read in units of a macroblock. At this time, the time required for reading image data of neighboring macroblocks of the stored macroblock may be ((L+27)*16)+(6*8+2*16), which is less than in Conventional Technique 1 or Conventional Technique 2. Thus, the time required for read and write operations with respect to image data of a 16×16 block according to the present invention may be (L*17+720) from which it can be seen that an access can be made within a shorter period of time when compared to Conventional Technique 1 and Conventional Technique 2.

Figure 9:
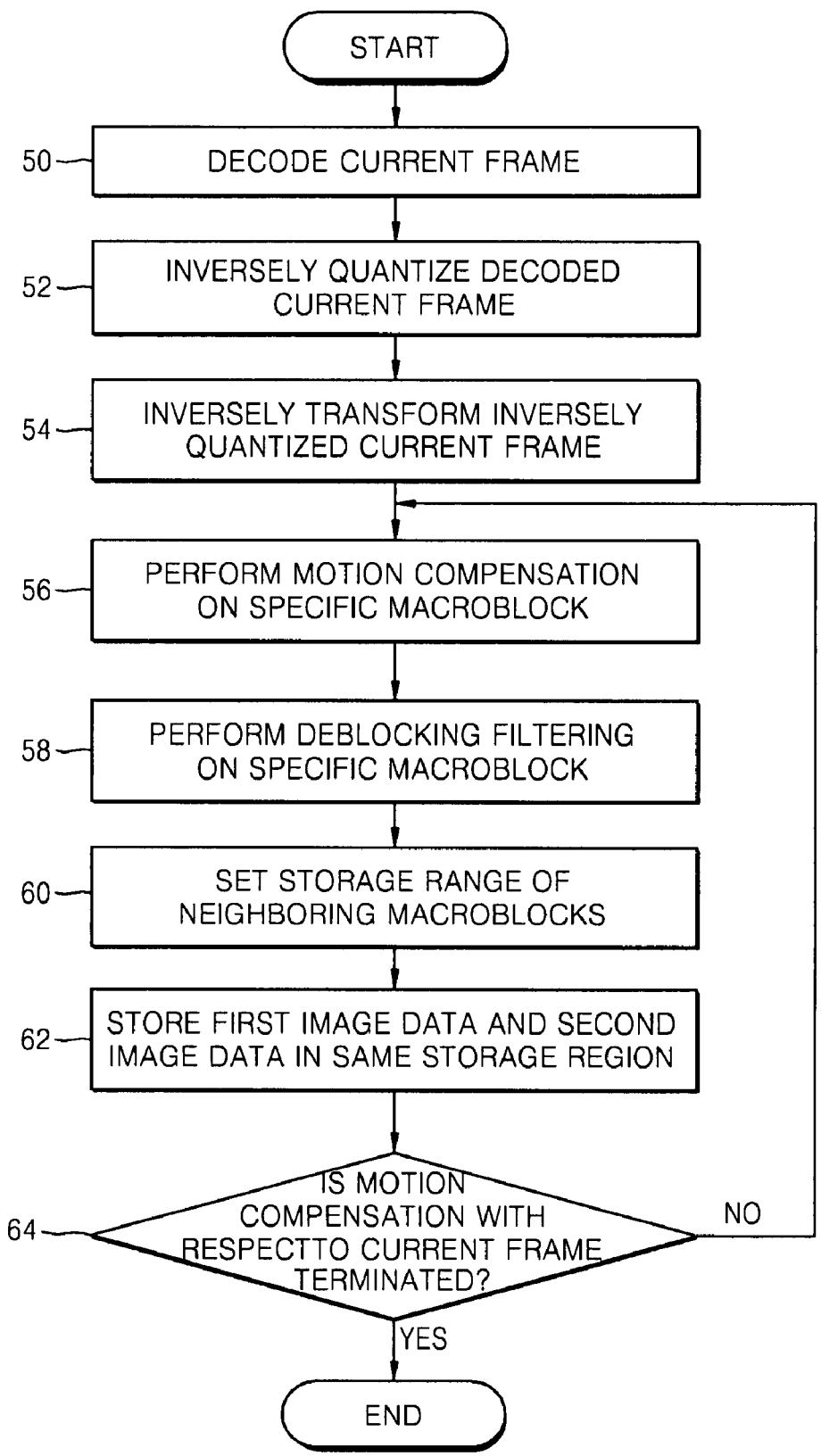
FIG. 9 illustrates a method of decoding image data, according to an embodiment of the present invention.

FIG. 9 illustrates a method of decoding image data, according to an embodiment of the present invention.

In operation 50, a current frame may be decoded. Entropy decoding may be performed on the current frame of encoded image data. Entropy decoding is known and thus will not be described in greater detail here.

In operation 52, the decoded current frame may be inversely quantized. The inverse quantization may be performed on image data of the decoded current frame using information about quantization coefficients used in encoding. Inverse quantization is known and thus will not be described in greater detail.

In operation 54, the inversely quantized current frame may be inversely transformed. Image data transformed from a spatial domain into a frequency domain by discrete cosine transform (DCT) may be inversely transformed from the frequency domain into the spatial domain. Inverse transformation is known and thus will not be described in greater detail herein.

In operation 56, motion compensation may be performed on a specific macroblock of the inversely transformed current frame using a motion-compensated previous frame. The motion compensation with respect to the specific macroblock of the current frame may be performed using a macroblock of a previous frame corresponding to the specific macroblock. Motion compensation is known and thus will not be described in greater detail herein.

In operation 58, deblocking filtering may be performed on the motion-compensated specific macroblock. Deblocking filtering refers to a process for removing distortion between macroblocks, generated in image decoding. Deblocking filtering may prevent display quality degradation on boundaries between blocks.

In operation 60, the storage range of neighboring macroblocks of the motion-compensated macroblock may be set to be stored with the motion-compensated macroblock. The setting of the storage range is may be similar to operation 34 of FIG. 5 and thus will not be described further here.

In operation 62, first image data of the motion-compensated macroblock and second image data corresponding to the storage range of the neighboring macroblocks may be stored in the same storage region of the memory. The storage of the first image data and the second image data may be similar to operation 36 of FIG. 5 and thus will not be described further here.

In operation 64, it may be determined whether motion compensation with respect to the current frame is terminated. If the motion compensation is not terminated, operations 56 through 62 may be repeated.

If the motion compensation is terminated, the process may be terminated. Once motion compensation with respect to the current frame and storage of the motion-compensated current frame in the memory are completed, motion compensation with respect to a next frame may be performed. The motion compensation with respect to the next frame may be performed using the first image data and the second image data stored in the same storage region of the memory.

Figure 10:
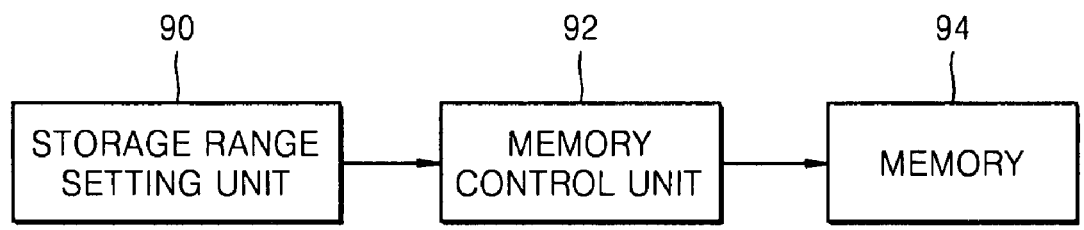
FIG. 10 illustrates a system for storing image data for fast memory access, according to an embodiment of the present invention.

FIG. 10 illustrates a system for storing image data for fast memory access, according to an embodiment of the present invention. The system may include, for example, a storage range setting unit 90, a memory control unit 92, and a memory 94.

The storage range setting unit 90 may set the storage range of macroblocks neighboring the macroblock, for storage with the macroblock, and may output the setting result to the memory control unit 92.

When the macroblock has a size of M×N, the storage range setting unit 90 may set the storage range expanded from the M×N macroblock to a region of (M+a−1)×(N+b−1) in consideration of a reference block of a×b. Here, the storage region of the M×N macroblock may be referred to as first image data and the storage region of neighboring macroblocks may be referred to as second image data. For example, when a macroblock to be stored has a size of 16×16, a reference block has a size of 9×9 and the expanded storage region may be a 24×24 block including the 16×16 macroblock. In this case, the 16×16 region of the 16×16 macroblock may be first image data and the region added to the 16×16 region may be second image data.

The storage range setting unit 90 may set the storage range of neighboring macroblocks included in at least one of the portions located above, below, on the left side of, and on the right side of the macroblock. In other words, as illustrated in FIG. 3, the storage range setting unit 90 may set at least one of the neighboring macroblocks ②, ③, and ⑨ located above the macroblock ① to be stored, the neighboring macroblocks ⑤, ⑥, and ⑦ located below the macroblock ①, the neighboring macroblocks ③, ④, and ⑤ located on the left side of the macroblock ①, and the neighboring macroblocks ⑦, ⑧, and ⑨ on the right side of the macroblock ①, as the storage range.

The memory control unit 92 may perform a control operation so that first image data of a macroblock and second image data corresponding to the storage range of neighboring macroblocks of the macroblock may be stored in the same storage region of the memory 94. The memory control unit 92 may perform a control operation so that the first image data and the second image data may be stored in the same row of the memory 94. To this end, the storage range setting unit 90 may set the storage range so that the first image data and the second image data are stored in the same row, e.g., in the same row under the control of the memory control unit 92.

Figure 11:
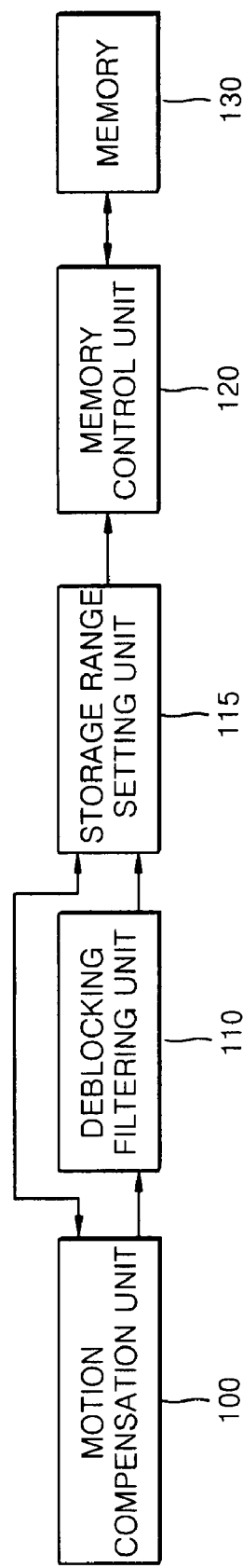
FIG. 11 illustrates a system for motion-compensating image data, according to an embodiment of the present invention.

FIG. 11 a illustrates a system for motion-compensating image data, according to an embodiment of the present invention. The system may include, for example, a motion compensation unit 100, a deblocking filtering unit 110, a storage range setting unit 115, a memory control unit 120, and a memory 130.

The motion compensation unit 100 may perform motion compensation with respect to a macroblock of a current frame using a motion-compensated previous frame and output the motion-compensated image data to the deblocking filtering unit 110. The motion compensation unit 100 may perform motion compensation using a macroblock of the previous frame corresponding to the macroblock of the current frame. In particular, the motion compensation unit 100 may perform motion compensation using image data of the macroblock of the previous frame corresponding to the macroblock of the current frame and image data of neighboring macroblocks of the macroblock of the previous frame. To this end, the memory control unit 120 may store image data of the macroblock of the previous frame and image data of neighboring macroblocks of the macroblock of the previous frame in the same storage region of the memory 130. Depending on an embodiment, the motion compensation unit 100 may be implemented as hardware.

The deblocking filtering unit 110 may perform deblocking filtering on the motion-compensated macroblock and output the filtered result to the storage range setting unit 115. The deblocking filtering unit 110 may perform filtering to remove distortion between macroblocks, generated in image decoding, and thereby may prevent display quality degradation on boundaries between blocks. Depending on an embodiment, the deblocking filtering unit 110 may be implemented as hardware.

The storage range setting unit 115 may set the storage range of neighboring macroblocks, of a macroblock to be stored, for storage with the macroblock and may output the setting result to the memory control unit 120. Such a storage range setting unit 115 has already been described in detail and thus will not be described further at this time.

The memory control unit 120 may perform a control operation so that first image data of the motion-compensated macroblock and second image data of neighboring macroblocks of the motion-compensated macroblock may be stored in the same storage region when the first image data is stored in the memory 130.

The memory 130 is a space in which image data of a previous frame required for motion compensation may be stored.

The memory control unit 120 may perform a control operation so that the second image data and the first image data are stored in the same storage region of the memory 130. In particular, the memory control unit 120 may perform a control operation so that the first image data and the second image data are stored in the same row of memory 130. To store the first image data and the second image data in the same row of memory 130, the size of the second image data may be limited to a predetermined size. The predetermined size may be determined in consideration of the maximum amount of data that can be stored in a row of the memory 130. Once motion compensation with respect to the current frame and storage of the motion-compensated current frame in the memory 130 are completed, motion compensation with respect to a macroblock of a next frame may be performed. To this end, the motion compensation unit 100 may be provided with the first image data and the second image data of the current frame stored in the memory 130 under the control of the memory control unit 120. The motion compensation unit 100 may perform motion compensation on a macroblock of a next frame using the provided first image data and second image data.

Figure 12:
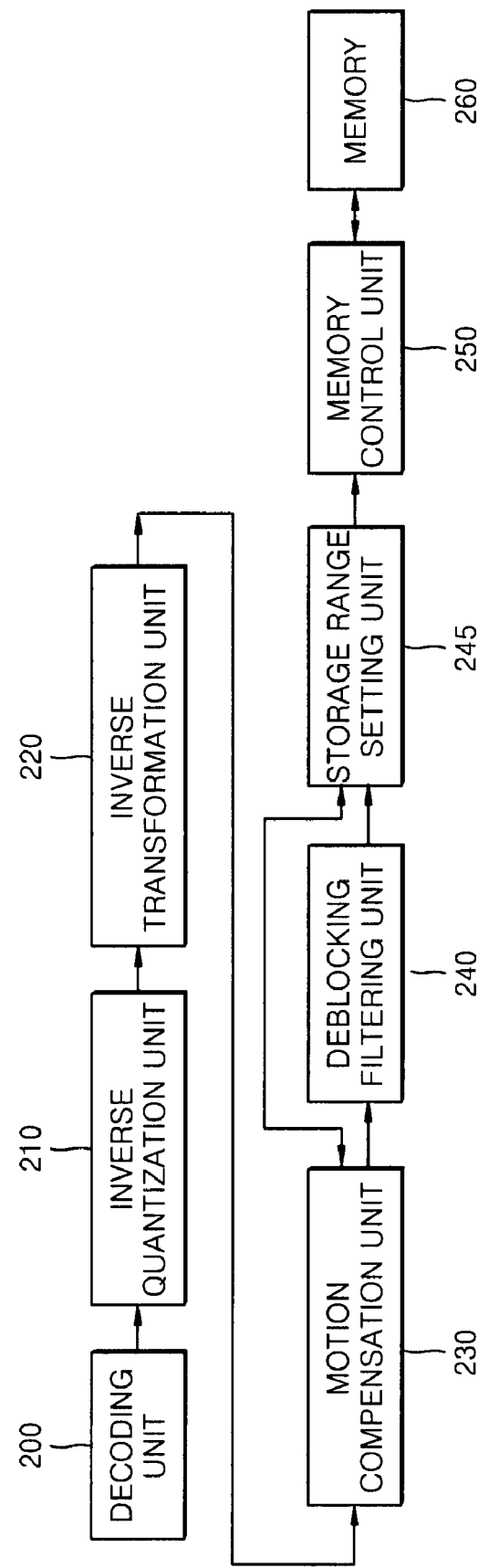
FIG. 12 illustrates a system for decoding image data, according to an embodiment of the present invention.

FIG. 12 illustrates a system for decoding image data, according to an embodiment of the present invention. The system may include, for example, a decoding unit 200, an inverse quantization unit 210, an inverse transformation unit 220, a motion compensation unit 230, a deblocking filtering unit 240, a storage range setting unit 245, a memory control unit 250, and a memory 260.

The decoding unit 200 may perform entropy decoding with respect to a current frame of encoded image data and output the entropy-decoded result to the inverse quantization unit 210. Entropy decoding is known and thus will not be described in greater detail here.

The inverse quantization unit 210 may inversely quantize the decoded current frame and output the inversely quantized result to the inverse transformation unit 220. The inverse quantization unit 210 may inversely quantize image data of the decoded current frame using information about quantization coefficients used in decoding. Inverse quantization is known and thus will not be described in greater detail here.

The inverse transformation unit 220 may inversely transform the inversely quantized current frame and output the inversely transformed result to the motion compensation unit 230. The inverse transformation unit 220 may inversely transform the image data that is transformed from a spatial domain into a frequency domain by DCT. Inverse transformation is known and thus will not be described in greater detail here.

The motion compensation unit 230 may perform motion compensation with respect to the inversely transformed macroblock of the current frame using the motion-compensated previous frame and output motion-compensated image data to the deblocking filtering unit 240. The motion compensation unit 230 may perform motion compensation using a macroblock of the previous frame corresponding to a macroblock of the current frame. In particular, the motion compensation unit 230 may perform motion compensation using image data of the macroblock of the previous frame corresponding to the macroblock of the current frame and image data of neighboring macroblocks of the macroblock of the previous frame. To this end, the memory control unit 250 may perform a control operation so that the image data of the macroblock of the previous frame corresponding to the macroblock of the current frame and the image data of neighboring macroblocks of the macroblock of the previous frame are stored in the same storage region of the memory 260. Depending on an embodiment, the motion compensation unit 230 may be implemented as hardware.

The deblocking filtering unit 240 may perform deblocking filtering on a specific macroblock that is motion compensated and output the filtered result to the storage range setting unit 245. The deblocking filtering unit 240 may remove distortion between macroblocks, generated in image decoding, and thereby may prevent display quality degradation on boundaries between blocks. Depending on an embodiment, the deblocking filtering unit 240 may be implemented as hardware.

The storage range setting unit 245 may set the storage range of macroblocks neighboring a macroblock for storage with the macroblock and output the setting result to the memory control unit 120. Such a storage range setting unit 245 has already been described in detail and thus will not be described further at this time.

The memory control unit 250 may perform a control operation so that first image data of the motion-compensated macroblock and second image data of neighboring macroblocks of the motion-compensated macroblock may be stored in the same storage region when the first image data is stored in the memory 260.

The memory 260 is a space in which image data of a previous frame required for motion compensation may be stored.

The memory control unit 250 may perform a control operation so that the second image data and the first image data are stored in the same storage region of the memory 260. In particular, the memory control unit 250 may perform a control operation so that the first image data and the second image data are stored in the same row of the memory 260. To store the first image data and the second image data in the same row of the memory 260, the size of the second image data may be limited to a predetermined size. The predetermined size may be determined in consideration of the maximum amount of data that can be stored in a row of the memory 260. Once motion compensation with respect to the current frame and storage of the motion-compensated current frame in the memory 260 are completed, the motion compensation unit 230 may perform motion compensation with respect to a macroblock of a next frame using the motion-compensated current frame. To this end, the motion compensation unit 230 may be provided with the first image data and the second image data of the current frame stored in the memory 260 under the control of the memory control unit 250. The motion compensation unit 230 may perform motion compensation on a macroblock of a next frame using the provided first image data and second image data.

One or more embodiments of the present invention may also be implemented through computer readable code/instructions in/on a medium, e.g., a computer readable medium, to control at least one processing element to implement any above described embodiment. The medium may correspond to any medium/media permitting the storing and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as carrier waves, as well as through the Internet, for example. Thus, the medium may further be a signal, such as a resultant signal or bitstream, according to embodiments of the present invention. The media may also be a distributed network, so that the computer readable code is stored/transferred and executed in a distributed fashion. Still further, as only an example, the processing element could include a processor or a computer processor, and processing elements may be distributed and/or included in a single device.

As described above, according to one or more embodiments of the present invention, by reducing the number of access attempts to a memory when image data is stored in the memory, the time delay required for accessing the image data may be minimized, thereby allowing faster image data processing. In addition, since the time delay required for memory access is minimized, the image data stored in the memory may be accessed without an excessively large bandwidth.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of storing image data for fast memory access, the method comprising:
    setting a storage range over neighboring macroblocks of a macroblock to allow for storage with the macroblock in a storage region of a memory; and
    storing first image data of the macroblock and second image data corresponding to the storage range over the neighboring macroblocks in the storage region of the memory, wherein the second image data includes data of portions of the neighboring blocks that fall within the storage range,
    wherein the setting of the storage range over the neighboring macroblocks comprises setting a range over neighboring macroblocks that overlap with a section having a size of $(M+a-1)\times(N+b-1)$ and including the macroblock as the storage range, wherein the macroblock has a size of $M\times N$ and a reference block has a size of $a\times b$.

2. The method of claim 1, wherein the setting of the storage range over the neighboring macroblocks comprises setting a storage range over neighboring macroblocks included in, at least one of, portions of the neighboring macroblocks located above, below, on a left side of, and on a right side of the macroblock.

3. The method of claim 1, wherein the storing of the first image data and the second image data in the storage region of the memory comprises storing the first image data and the second image data in a same row of memory.

4. The method of claim 3, wherein the setting of the storage range over the neighboring macroblocks comprises setting the storage range over the neighboring macroblocks so that both the first image data and the second image data can be stored in the same row of memory.

5. The method of claim 1, wherein the second image data is information for motion compensating the macroblock.

6. The method of claim 1, wherein the second image data is for decoding the stored first image data.

7. A non-transitory computer readable medium comprising computer readable code to control at least one processing element to implement the method of claim 1.

8. A system storing image data for fast memory access, the system comprising:
    a storage range setting processor to set a storage range over neighboring macroblocks of a macroblock to allow for storage with the macroblock in a storage region; and
    a memory controller to control storing of first image data of the macroblock and second image data corresponding to the storage range over the neighboring macroblocks in a same storage region, wherein the second image data includes data of portions of the neighboring blocks that fall within the storage range; and
    a memory to store the first image data and the second image in the same storage region,
    wherein the storage range setting processor sets a range over neighboring macroblocks that overlap with a section having a size of $(M+a-1)\times(N+b-1)$ and including the macroblock as the storage range, wherein the macroblock has a size of $M\times N$ and a reference block has a size of $a\times b$.

9. The system of claim 8, wherein the storage range setting processor sets a storage range over neighboring blocks included in, at least one of, portions of the neighboring blocks located above, below, on a left side of, and on a right side of the macroblock.

10. The system of claim 8, wherein the memory controller controls storing of the first image data and the second image data in a same row of memory when storing the first image data and the second image data in the storage region of the memory.

11. The system of claim 10, wherein the storage range setting processor sets the storage range over the neighboring macroblocks so that both the first image data and the second image data can be stored in the same row of memory.

12. The system of claim 8, wherein the second image data is information for motion compensating the macroblock.

13. The system of claim 8, wherein the second image data is for decoding the stored first image data.

14. A system for storing image data for fast memory access, the system comprising:
    a processor to set a storage range over neighboring macroblocks of a first macroblock to allow for storage with the first macroblock in a first storage region of a memory; and
    a controller to control storing of first image data of the first macroblock and second image data corresponding to the storage range over the neighboring macroblocks in the first storage region of the memory, so that a number of required accesses to the memory is reduced,
    wherein the memory stores the first image data and the second image in the first storage region,
    wherein the processor sets a range over neighboring macroblocks that overlap with a section having a size of $(M+a-1)\times(N+b-1)$ and including the macroblock as the storage range, wherein the macroblock has a size of $M\times N$ and a reference block has a size of $a\times b$.

15. The system of claim 14, wherein the first storage region is a same row of the memory.

16. A method of storing image data for fast memory access, the method comprising:
    setting a storage range over neighboring macroblocks of a first macroblock to allow for storage with the macroblock in a first storage region of a memory;
    storing first image data of the first macroblock and second image data corresponding to the storage range over the neighboring macroblocks in the first storage region of the memory; and
    storing first image data of a second macroblock in a second storage region of the memory, wherein the second macroblock is one of the neighboring macroblocks and the second image data of the first macroblock corresponds to a portion of the second macroblock represented by the first image data of the second macroblock,
    wherein the setting of the storage range over the neighboring macroblocks comprises setting a range over neighboring macroblocks that overlap with a section having a size of $(M+a-1)\times(N+b-1)$ and including the macroblock as the storage range, wherein the macroblock has a size of $M\times N$ and a reference block has a size of $a\times b$.

17. A system storing image data for fast memory access, the system comprising:

a storage range setting processor to set a storage range over neighboring macroblocks of a first macroblock to allow for storage with the macroblock in a first storage region of a memory;

a first memory controller to control storing of first image data of the first macroblock and second image data corresponding to the storage range over the neighboring macroblocks in the first storage region of the memory; and a second memory controller to control storing of first image data of a second macroblock in a second storage region of the memory, wherein the second macroblock is one of the neighboring macroblocks and the second image data of the first macroblock corresponds to a portion of the second macroblock represented by the first image data of the second macroblock, wherein the storage range setting processor sets a range over neighboring macroblocks that overlap with a section having a size of (M+a−1)×(N+b−1) and including the macroblock as the storage range, wherein the macroblock has a size of M×N and a reference block has a size of a×b.

18. A non-transitory computer readable medium to record image data comprising a plurality of macroblocks, the non-transitory computer readable medium comprising:

a first memory region comprising first image data of a first macroblock and second image data corresponding to a storage range over neighboring macroblocks of the first macroblock in the image; and a second memory region comprising first image data of a second macroblock, the second macroblock being one of the neighboring macroblocks, and wherein the second image data of the first macroblock corresponds to a portion of the second macroblock represented by the first image data of the second macroblock, and wherein setting a range over neighboring macroblocks that overlap with a section having a size of (M+a−1)×(N+b−1) and including the macroblock as the storage range, wherein the macroblock has a size of M×N and a reference block has a size of a×b.

* * * * *

UNITED STATES PATENT AND TRADEMARK OFFICE
CERTIFICATE OF CORRECTION

PATENT NO.        : 8,189,675 B2
APPLICATION NO.   : 11/730130
DATED             : May 29, 2012
INVENTOR(S)       : Doo-hyun Kim et al.

It is certified that error appears in the above-identified patent and that said Letters Patent is hereby corrected as shown below:

On the Title Page, item [73] (Assignee), Line 1, Delete "Electonics" and insert -- Electronics --, therefor.

On the Title Page, item [56] (Other Publications), Line 1, Delete "Anmation"" and insert -- Animation" --, therefor.

Column 13, Line 63, In Claim 8, after "second image" insert -- data --.

Column 14, Line 36 (Approx.), In Claim 14, after "second image" insert -- data --.

Signed and Sealed this
Twenty-eighth Day of August, 2012

David J. Kappos
*Director of the United States Patent and Trademark Office*